United States Patent [19]

Kelly et al.

[11] Patent Number: 5,007,943
[45] Date of Patent: Apr. 16, 1991

[54] SOL-GEL PROCESS ALUMINA ABRASIVE GRAIN BLENDS IN COATED ABRASIVE MATERIAL

[75] Inventors: Robert G. Kelly, Latham; Bernard T. Loughlin, Averill Park; William F. McCutcheon, Rexford, all of N.Y.

[73] Assignee: Norton Company, Worcester, Mass.

[21] Appl. No.: 431,400

[22] Filed: Nov. 3, 1989

[51] Int. Cl.$^5$ .................................. B24B 1/00
[52] U.S. Cl. .............................. 51/295; 51/309
[58] Field of Search ............................ 51/295, 309

[56] References Cited

U.S. PATENT DOCUMENTS

| | | | |
|---|---|---|---|
| 3,891,408 | 6/1975 | Rowse et al. | 51/295 |
| 3,893,826 | 7/1975 | Quinan et al. | 51/295 |
| 4,543,107 | 9/1985 | Rue | 51/309 |
| 4,623,364 | 11/1986 | Cottringer et al. | 51/309 |
| 4,652,274 | 3/1987 | Boettcher et al. | 51/295 |
| 4,741,743 | 5/1988 | Narayanan et al. | 51/309 |
| 4,836,832 | 6/1989 | Tumey et al. | 51/295 |

Primary Examiner—William R. Dixon, Jr.
Assistant Examiner—Willie Thompson
Attorney, Agent, or Firm—David Bennett

[57] ABSTRACT

Coated abrasive material having blends of abrasive grains of sol gel process alumina and alumina-zirconia in a volume ratio of at least 15% sol gel abrasive grain provide improved performance in certain grinding applications and a more universal coated abrasive product for a wider range of grinding applications than such products of either abrasive grain alone.

12 Claims, No Drawings

SOL-GEL PROCESS ALUMINA ABRASIVE GRAIN BLENDS IN COATED ABRASIVE MATERIAL

BACKGROUND OF THE INVENTION (a) Field of the Invention

This invention relates, in general, to coated abrasive material and articles manufactured therefrom. More particularly, the invention relates to coated abrasive material comprising combinations of abrasive grain, in particular combinations of sol-gel process alumina abrasive grains with abrasive grains of cofused alumina-zirconia.

(b) Description of the Prior Art

Coated abrasive material typically comprises a relatively flexible backing member onto the front surface of which is coated an adhesive layer, the so-called "maker coat," followed by the application of a layer of abrasive grains onto the maker coat while such is still wet. The maker coat is then partially cured to a hardened layer after which another adhesive layer, the "size coat," is applied. The adhesive layers are then fully cured. The coated abrasive material is subsequently formed into various products, e.g., sandpaper, abrasive disks, endless belts, etc., depending somewhat upon the particular components of the coated abrasive material manufactured and its manner of processing.

The effectiveness of the material used as the abrasive grain in any particular coated abrasive material varies not only with the particular grinding conditions but also with the particular material or workpiece being ground. For example, certain abrasive grains have been found to be more effective for grinding stainless and low carbon steels at high metal removal rates than other abrasive grains. And certain other abrasive grains have been found more effective than others in relatively slow grinding applications. The explanation for the different effectiveness of a given abrasive material under differing grinding applications is often not clearly understood. Nevertheless, such appears, at least, to be related to, and dependent upon, the chemical composition of the abrasive material, and its microstructure, the related physical properties of the abrasive material such as hardness, fracture toughness, impact strength, and the thermal properties. The lack of such understanding naturally makes difficult the prediction of the effectiveness of a given abrasive material or grain for any particular grinding application, in the absence of prior experience. Thus, in determining whether or not an abrasive grain will be effective in any particular application, or the extent of such effectiveness, much depends upon trial and error.

Prior to the early 1960s, the abrasive grains used in coated abrasive material were, in general, either flint, emery, garnet, aluminum oxide, or silicon carbide, the latter two abrasives being man-made in electric furnaces according to well-known techniques. The so-called "fused alumina" provides, in general, a more chunky and tougher abrasive grain than silicon carbide and has been found over the years to be particularly well adapted to sanding operations on high tensile materials such as high carbon steel, alloy steels, tough bronze, and certain hard woods. When intended as a coated abrasive grain for woodworking, the crushing technique on the crude is varied to produce a somewhat sharper grain than that used generally for heavy metal working. Its hardness and sharpness has long made silicon carbide the ideal coated abrasive grain for sanding low-tensile metals, glass, plastics, fibrous woods, leather, enamel, and other relatively soft materials. Nevertheless, the applications for which such abrasive grains are now known to be best suited have been discovered only through much time and effort spent over the years, since these abrasive materials were first manufactured, in evaluating and testing of the abrasive grains in various applications and under various grinding conditions.

In the early 1960s, however, abrasive grains comprising a fused alloy-type alumina-zirconia (or "zirconia-alumina") composition became commercially available. Such abrasive materials are disclosed in U.S. Pat. Nos. 3,181,939; 3,891,408; and 3,893,826, all of which are assigned to Norton Company, the assignee of this application. The entire disclosures of these patents are incorporated herein by reference. As disclosed in the two later issued patents, the cofused alumina-zirconia abrasives disclosed therein were found quite effective in coated abrasive material for grinding 304 stainless steel and for grinding low carbon steels at high metal removal rates, but such abrasive material is disclosed to be less effective, as compared to fused alumina, at relatively slow grinding conditions. Nevertheless, since first introduced the alumina-zirconia abrasive grains have been discovered through empiricism to be a better across the board abrasive in coated abrasives in any use than fused alumina. Such more general use, however, comes at a premium compared to the cost of coated abrasive material containing only fused alumina abrasive grains.

More recently, there has become available another abrasive grain for use in the manufacture of coated abrasive material. Such novel abrasive material is obtained, in general, by drying and sintering a hydrated alumina gel which may also contain varying amounts of additives such as MgO and $ZrO_2$. The dried material is typically crushed either before or after sintering to obtain irregular blocky shaped polycrystalline abrasive grain or grits in a desired size range. The grits may be later incorporated in abrasive products such as coated abrasive disks or belts.

Exemplary of prior art disclosing such abrasive material is U.S. Pat. No. 4,623,364, which issued on Nov. 18, 1986 to Norton Company, the assignee of the instant application. The entire disclosure of this patent is incorporated herein by reference. Other patents disclosing sol gel process (i.e., non-fused) alumina abrasive material and abrasive products containing such abrasive grains are U.S. Pat. Nos. 4,314,827; 4,543,107; 4,741,743; 4,744,802; and 4,800,685. U.S. Pat. Nos. 4,543,107 and 4,741,743 are both assigned to Norton Company, the entire disclosures of which are incorporated herein by reference.

U.S. Pat. No. 4,314,827 to Leitheiser et al. discloses abrasive grits made by the sol gel method in which the sintered abrasive grits are obtained from a calcium ion-free and alkali metal-ion free, dense aluminum oxide based abrasive material having a substantially microcrystalline structure of randomly oriented crystallites of alpha $Al_2O_3$ and a modifying component with the alumina being a dominant continous phase. The mineral disclosed has a very fine crystal size throughout.

U.S. Pat. No. 4,543,107 discloses a vitrified (ceramic) bonded grinding wheel having sintered sol gel aluminous abrasive grits comprising sub-micron sized alpha alumina crystals. Contrary to prior art sintered gel type alumina or fused alumina, the use of the abrasive disclosed in this patent in vitrified wheels was discovered to be extremely sensitive to the firing temperature of the wheel. As a result, it was found necessary to control the viscosity of the bond and/or temperature of firing to avoid reaction between the bond and the abrasive.

U.S. Pat. No. 4,623,364 discloses a sol gel method for the manufacture of aluminous abrasive grits, and products other than abrasive grits such as coatings, thin films, fibers, rods or small shaped parts, having enhanced properties. In that patent it is disclosed that the conversion of the hydrated alumina to alpha alumina is facilitated by the introduction of seed material into the gel or the gel precursor prior to drying. To make abrasive grits the seeded gel is dried, crushed and fired. The abrasive grits so produced may be used in the manufacture of products such as coated abrasive discs and grinding weeels.

Sol gel abrasive material, and particularly seeded sol gel aluminous abrasives as disclosed in U.S. Pat. No. 4,623,364, have demonstrated substantial advantages over other abrasives, even such premium abrasives as alumina-zirconia, in certain coated abrasive applications since their introduction some few years ago. Compared to the aluminum-zirconia abrasive material, however, the sol-gel processed alumina abrasive has been discovered to be more selective in its performance in coated abrasive applications. Thus, it has been found, compared to alumina-zirconia abrasive, to provide superior performance in only certain metal grinding applications, e.g., in high stress areas such as the super alloys and aircraft alloys, e.g., the corrosion-resistant alloys of nickel and chromium such as "Inconel" and other high nickel metals, and in tool steels, etc. Nevertheless, in certain low carbon steel applications, its performance has been discovered to be only equivalent to, or perhaps slightly better than, the alumina-zirconia abrasive material. In general, an improvement in low carbon steel grinding applications using sol gel process alumina abrasive grains in coated abrasive material, compared to the alumina-zirconia grain, has been found only in high pressure, high stress, and high speed grinding applications. Such abrasive grain is considerably more costly than the alumina-zirconia abrasive and for that reason would not ordinarily be used in any such an application where no real benefit in performance is gained. In the grinding of stainless steel, titanium, and in some of the wood working applications, moreover, the sol gel process alumina abrasive has been discovered to be even less effective in coated abrasive material than the alumina-zirconia abrasive material.

Although the alumina-zirconia abrasive grains and those of sol gel process alumina have been found to provide superior performance in coated abrasive material in various broad applications, compared to the earlier used somewhat "inferior" abrasive minerals such as alumininum oxide, silicon carbide, etc., above-mentioned, the use of such in coated abrasive material comes at a premium in cost. Accordingly, there is continuing effort to satisfy the desire for and to provide coated abrasive material in which these superior abrasive grains are used, to take advantage of their superior performance characteristics but at a lower cost.

The combining of abrasive grains of two different abrasive minerals in coated abrasive material has long been done, for various reasons, e.g., to obtain a cheaper abrasive product for a particular application, to provide different or improved performance characteristics, improvement in cutting performance in a specific application, etc. In other cases, abrasive grains have been combined in coated abrasive manufacture to provide an improved manufacturing process or to reduce the overall cost of the coated abrasive material being manufactured. The combining of different abrasive grains in a coated abrasive product has been done by various manufacturing procedures, depending somewhat upon the specific performance or other results desired. In some cases, a mixture of abrasive grains of different chemical composition are provided in a single grain layer. At other times, the different abrasive grains are provided in separate grain layers, i.e., two maker coats and two grain coats are provided in the coated abrasive material. Other coated abrasive material may have one maker and two abrasive grain layers, with the relatively finer graded abrasive grains on the bottom and the coarser grains on top. Exemplary of prior art disclosing such coated abrasive material are U.S. Pat. Nos. 3,007,560; 3,606,764; 3,891,408; 3,893,826, 4,314,827; 4,409,791; 4,741,743; 4,744,802; and 4,800,685. Generally, however, where there is a combining of abrasive grains of different composition to lower the cost of the coated abrasive material there is a trade-off of some lesser performance. This is particularly so in the case where the layer of abrasive grains contacting the workpiece, i.e., the top layer in a dual layer of abrasive grains, is a combination of abrasive grains of different chemical composition.

U.S. Pat. No. 3,007,560, which isssued to Norton Company, discloses abrasive agglomerates for use in coated abrasive material which comprises a matrix of cellular glass and abrasive grit particles encapsulated in the cell walls. The abrasive grits can be co-fused alumina-zirconia, silicon carbide or alumina abrasive grits, or a mixture thereof. Generally, however, the finish obtained with such agglomerates is not as good as that obtained from coated abrasive material conventionally UP electrostatically coated with only either abrasive grain alone.

U.S. Pat. No. 3,606,764 discloses coated abrasive material comprising particles of sintered hard metal carbides, e.g., tungsten carbide, and particles of harder material such as alumina, zirconiaalumina, natural corundum, silicon carbide or emery bonded to a support member. Such coated abrasive material is preferably in the form of a disk or endless belt and is used particularly for abrading metal substrates, especially steel.

U.S. Pat. Nos. 3,891,408; and 3,893,826, both of which are assigned to Norton Company, assignee of the present application, each discloses coated abrasive material in which a double coat of abrasive grains are applied. Thus, there is disclosed in U.S. Pat. No. 3,891,408 coated abrasive material having a first layer of high purity alumina abrasive grains in first maker coat and a top layer of alumina-zirconia abrasive grains in a second maker coat. Such an abrasive product was discovered to outperform a double coated abrasive product containing only conventional high purity alumina abrasive grains in each of the layers, when evaluated on A-6 steel and 304 stainless steel. No blends of the alumina-zirconia abrasive grains with other abrasive grains in coated abrasive material, however, are disclosed in this patent.

In U.S. Pat. No. 3,893,826, the patentees therein disclose that one reason for the mixing of one abrasive grain with other abrasive grains of different shape and/or composition is to intensify the forces on that abrasive grain. Thus, to intensify the forces on certain alumina-zirconia abrasive grains having a lesser zirconia content, the patentees disclose a double coated product such as is disclosed in U.S. Pat. No. 3,891,408. Again, the double coated abrasive product containing a layer of fused alumina abrasive grains and a layer of alumina-zirconia grains was found to outperform coated abrasive material containing only fused alumina abrasive grains, in evaluations on 1018 high carbon steel and 304 stainless steel. No blends of alumina-zirconia abrasive grain with other abrasive grains in a single layer, however, are disclosed.

U.S. Pat. No. 4,314,827, earlier disclosed and which issued on Feb. 9, 1982, discloses, in Examples 44-46, blends of sol gel process alumina and fused alumina abrasive granules in varying proportions, used in nonwoven abrasive products, and evaluated on 1018 cold rolled steel. The test results show that the nonwoven abrasive products containing all or substantial amounts of the non-fused abrasive granules removed much more stock during the first 2-minute runs, and removed a greater amount of stock for the entire 8 runs, than did the abrasive products containing 50% or more fused alumina. Fused alumina, according to the patentees, outperforms alumina-zirconia in the same test. No blends of sol gel process alumina grains and alumina-zirconia grains are disclosed in, or even suggested, it is believed by, this patent.

U.S. Pat. No. 4,409,791 discloses coated abrasive material which comprises a dispersion of abrasive particles in a binding agent coated onto a flexible backing member. Suitable abrasives are flint, garnet, alumina or its mixtures with zirconia, silicon carbide, diamond, etc. The performance of such slurry coated abrasive mixtures is known to be somewhat less desirable than that obtainable from conventional UP coated abrasive grains due in part at least to the fact that abrasive grains of finer grit size are used.

U.S. Pat. No. 4,741,743, assigned to Norton Company, and which issued on May 3, 1988, discloses blends of sol gel process alumina abrasive grains and cofused alumina-zirconia abrasive grains used in the manufacture of grinding wheels. As disclosed in that patent, grinding wheels from such blends have performed better at intermediate grinding rates than wheels of either such abrasive material alone. Not only has this abrasive grain mixture found somewhat limited application in bonded abrasive wheels, the performance of abrasive grains in bonded abrasive applications have historically served as no predictor of what manner of performance may be achieved when such abrasive grains are used in coated abrasive material.

In U.S. Pat. No. 4,744,802, which issued on May 17, 1988, directed to a seeded sol gel process alumina that may be used in the manufacture of coated abrasive material, discloses that such abrasive grains are preferably blended with less expensive conventional abrasive grain such as fused alumininum oxide, silicon carbide, garnet, and fused alumina-zirconia. Nevertheless, even though the patentee discloses numerous examples, the patent does not, it is believed, disclose a single example of an abrasive grain blend, let alone one comprising the sol gel alumina disclosed and another abrasive.

U.S. Pat. No. 4,800,685, which issued on Jan. 31, 1989, discloses blends of sol gel alumina abrasive grain with conventional fused alumina abrasive grains and with silicon carbide grains. Such combinations, according to the patentee, have been found to provide superior performance in grinding wheels in the grinding of cast iron, a very specific application, compared to wheels containing either abrasive grain alone. There is no suggestion by this patent, however, that such an abrasive blend would be found suitable for use in coated abrasive material, or that such a blend could provide improved performance in coated abrasive material in any application. Neither does this patent disclose a blend of sol gel alumina abrasive grains and grains of alumina-zirconia. As a matter of fact, it appears from the disclosure that the abrasive blends disclosed in this patent are intended as a more economical replacement for grinding wheels comprising alumina-zirconia grains alone used in this application.

Norton Company, the assignee of the instant application, has for sometime marketed coated abrasive products in which the abrasive layer comprises a blend of fused alumina grains and cofused alumina-zirconia grains. In general such abrasive products do not provide as good a cut performance as coated abrasive products of 100% alumina-zirconia grains. Nevertheless, such an abrasive blend does result in coated abrasive material providing an upgrade in performance, compared to a product having only fused alumina grains. Somewhat more recently there has appeared in the marketplace a coated abrasive material in the form of conventional fibre discs that have a blend of sol gel alumina abrasive grain and fused alumina oxide grain in the abrasive layer. These coated abrasive discs have been found, in some cases at least, e.g., in the grinding of flat welds, to outperform coated abrasive material having only alumina-zirconia abrasive grains therein. The abrasive grain blends in these discs appear to be at least 50% by weight sol gel alumina abrasive grains. Such sol gel alumina blend coated abrasive products appear to be disclosed in U.S. Pat. Nos. 4,734,104; and 4,737,163. As disclosed in these patents a superior abrasive grain, e.g. one of zirconia-alumina or sol gel process alumina, is used to replace the coarse fraction, or at least a portion thereof, in a full grade of inferior grain such as fused alumina. The abrasive grain may be applied in two layers, if desired, as more particularly disclosed in the last mentioned patent, the coarse grain being applied in the second, or top layer.

In European Patent application No. 0 318 168, which was published on May 31, 1989, there is disclosed abrasive grains of sol gel process alumina having the shape of platelets. These abrasive grain platelets can be, according to the disclosure, blended with abrasive grains of other material, at least 15% by weight, and preferably 50 to 100% by weight, of the grains in the abrasive product being the platelet shape grains.

SUMMARY OF THE INVENTION

An object of the present invention is to provide coated abrasive material having a novel combination of abrasive grains of sol gel process alumina and of alumina-zirconia.

A further object is to provide coated abrasive material having a blend of sol gel process alumina abrasive grains and grains of alumina-zirconia in a single layer.

A still further object is to provide coated abrasive material having a blend of abrasive grains of sol process alumina and alumina-zirconia which provides a superior performance in certain grinding applications compared to that performance found in coated abrasive material of either abrasive mineral alone.

An even further object of the invention is to provide coated abrasive material having a blend of sol gel process alumina abrasive grains with abrasive grains of alumina-zirconia which incorporates the best features of each separate abrasive grain.

Although all the various combinations of abrasive grains known heretofore and of which we are aware, and in particular those disclosed in the prior art patents above disclosed, may have been found to provide superior performance in certain applications or other desired characteristics, none of such, it is believed, could be said to predict the inventions that have been discovered and that are disclosed in this application. One reason for this is because the sol gel process alumina and alumina-zirconia abrasive materials, and the abrasive grains obtained from each have very different microstructures and material properties which cause the abrasive grains to fracture or breakdown differently. Moreover, in any particular application, the stress in the grains and the type of fracture resulting is influenced by the applied pressure on and the particle size distribution (grading) of the abrasive grains in any particular coated abrasive product. Thus, it is not believed possible to predict future performance in any blend of such abrasive grains, based upon past performance in any particular application. In particular, it could not be predicted, it is believed, that certain blends of non-fused sol gel process aluminous abrasive grain and fused alunina-zirconia abrasive grains in coated abrasive material would provide superior performance in certain applications as disclosed later herein more fully than coated abrasive material of either abrasive grain alone.

Quite advantageously, coated abrasive material comprising a blend of sol gel process (non-fused) alumina abrasive grains and abrasive grains of fused alumina-zirconia abrasive grains can be provided in accordance with the invention which performs substantially as well as or better than a straight sol gel abrasive material in all applications tested to date except in the grinding of Inconel steel.

A further advantage is that coated abrasive material can be provided according to the invention that dramatically outperforms coated abrasive material having only alumina-zirconia abrasive grains except on stainless steel in which application it nevertheless performs substantially equal to such coated abrasive material.

There results the further advantage that coated abrasive material is provided by the invention which, although not suitable for optimum performance for all applications, nevertheless has the economic advantage of reducing the variety of coated abrasive material needed to cover a substantial range of applications and operating conditions. Thus, the need for manufacture of a wide variety of coated abrasive material is somewhat reduced, resulting in less inventory that must be kept on hand by not only the manufacturer but also the user, further resulting in a reduction of costs overall.

DESCRIPTION OF THE PRIOR ART AND THE PREFERRED EMBODIMENTS OF THE INVENTION

The manufacture of coated abrasive material according to the invention can be accomplished, for the most part, by conventional techniques well known to those skilled in the art. The backing member can be of any material now conventionally used in the manufacture of coated abrasives. This includes paper, film, woven and stitch bonded cloth, such as rayon, cotton drills and jeans, nylon and polyesters, cloth combinations, e.g., nylon fill and polyester warp yarns, vulcanized fiber, dimensionally stable polyester film and the like, sized or otherwise pretreated with various materials according to usual techniques, depending somewhat upon the end use intended for the coated abrasive material. The sizing and filling materials for the backing member, if used, can be starch, glue, filled or otherwise as desired, or of a resinous material such as phenol-aldehyde.

The initial bonding layer or maker coat can be any of the conventional resinous materials such as , e.g., phenol-aldehyde, epoxy resin, and the like. Following application of the abrasive grain layer, a sand size coat may be applied, if desired. This coat may be of the same, or of a different, composition as the maker coat, as typically provided. For example, where the sand size coat is of a heat-hardened resinous material, the maker adhesive coat can be of either glue or resinous material, as desired. An example of a conventional resinous maker adhesive comprises an aqueous solution containing 48% phenol-formaldehyde resin solids and 52% calcium carbonate filler.

Following coating of the maker coat on the backing member, the abrasive grains are then applied to the wet maker coat according to usual techniques, upward electrostatic propulsion or projection being preferred in most cases. Nevertheless, in some cases the grain may be applied by gravity coating as conventionally done. The maker coat, if a phenol-formaldehyde resinous composition, may then be conventionally partially cured, for instance, for 90 minutes at a temperature increasing from about 175° to about 235° F., depending on the formulation. This is then followed by application of the size coat or adhesive, an example of which is a conventional, more dilute, aqueous solution containing 48% phenol-formaldehyde resin and 52% calcium carbonate filler. The coated abrasive material is then further conventionally heated to dry the size coat and to partially cure that layer by heating from about 165° to about 235° F. over a period of about 135 minutes. The coated abrasive sheet material is then taken down from the oven racks and rolled up into rolls of conventional size, after which it is further cured typically at a temperature of about 225°-235° F. for 6-8 hours, to cure the resin in the maker and size coats to the desired hardness. Subsequently, depending on the backing member, the coated abrasive material may be conditioned under controlled humidity, e.g., 50% relative humidity, 70° F., overnight. The coated abrasive material is then ready for further processing into various abrasive products, e.g., abrasive discs, belts, etc. according to conventional techniques well known to those skilled in the art.

Conventional radiation curable (E-beam or UV) resins and compositions thereof used in the manufacture of coated abrasive material may also be used on any or all of the cloth finishing or adhesive layers, if desired.

Coating of the adhesive coats onto the backing member, in general, is accomplished according to conventional coating techniques, e.g. roll coating, gravure coating, etc., well known to those skilled in the art of coated abrasive manufacture.

The drying and curing of the maker and size coats can be accomplished in conventional festooned drying ovens or other means well known to those skilled in the art of manufacture of coated abrasive material. The temperature and residence time in such ovens, as earlier disclosed, will depend upon the particular compositions involved and such conditions can be provided according to well known techniques as required.

The abrasive in the coated abrasive material according to the invention, in the preferred aspect, comprises a blend of abrasive grains of sol gel process alumina with abrasive grains of alumina-zirconia. Test results indicate that improved or substantially equivalent performance of coated abrasive material of this invention results when the abrasive blend used is in the ratio (by volume) of from at least about 15, preferably from about 25 to 75, percent by volume of sol gel process alumina. Critically, however, for optimum performance the abrasive blend of sol gel process alumina grains and alumina-zirconia grains should be a mixture having about 50% (by volume) of each of the abrasive grains. Nevertheless, in some grinding applications, two layers of abrasive grain, rather than a single layer can be provided. Such dual abrasive grain layers can be provided according to conventional manufacturing techniques known heretofore. The dual grain layers can be provided in a split coat, if desired, according to usual manner, i.e., two grain layers and one layer of maker coat, or in other cases with dual maker coats and grain layers. In such coated abrasive material, the first abrasive grain layer can be of any abrasive material used heretofore, e.g., aluminum-oxide, silicon carbide, garnet, etc. The top layer of abrasive grains, i.e., the layer contacting the workpiece, will always be the blend of alumina-zirconia and sol gel alumina grains according to the invention, in the volume ratio above set forth. The maker coat composition, in the case where two maker coats are used, can be the same in both maker layer or different, as desired.

The preferred sol gel alumina abrasive grains are of a seeded sol gel aluminous abrasive such as disclosed in U.S. Pat. No. 4,623,364, above-disclosed. Such abrasive material, as disclosed in that patent, comprise submicron sized alpha alumina crystals and have a hardness greater than 16 GPa, and a density greater than 90% of theoretical. Nevertheless, other sol gel process alumina abrasive material disclosed in any of the before-mentioned patents may also be found satisfactory in certain applications.

The alumina-zirconia abrasive material suitable for use in this invention is disclosed, in general, in U.S. Pat. No. 3,181,939, earlier above disclosed. Abrasives having a near alumina-zirconia eutectic composition, about 35 to about 50%, preferably from about 38 to about 43, percent by weight zirconia, according to U.S. Pat. No. 3,891,408 are preferred. The preferred abrasive material will have a primary numerical average crystal size of less than about 50 microns and a colony size of eutectic of less than about 65 microns. The zirconium oxide in the abrasive material composition is preferably at least about 25%, more preferably about 45% in the tetragonal crystal form. Nevertheless, other such cofused abrasive material may also be found suitable for certain applications.

The abrasive grains can be of any grit size typically used in the manufacture of coated abrasive material, e.g., from 16 to 400. Nevertheless, as usual, for certain grinding applications certain grit sizes will be found more effective in performance than others. The shape of the abrasive grains is preferably that of the weaker shaped grains, well known to those in the coated abrasive art. Such shape is obtained by conventional crushing means.

The following examples are illustrative of certain specific embodiments of this invention; however, these examples are only for purposes of better illustrating the invention disclosed herein and are not to be construed as necessary limitations upon the invention unless indicated as being critical.

EXAMPLE 1

Manufacture of Coated Abrasive Material Containing Blends of Sol-Gel Process Alumina Grain With Fused Alumina-Zirconia Abrasive Grains In this example, coated abrasive fibre discs comprising various abrasive grain blends, as indicated below in Table 1, of sol gel (S.G.) process alumina abrasive grains with abrasive grains of alumina-zirconia (A.Z.) were evaluated in various grinding applications. The sol gel process alumina, in this case "seeded sol gel," abrasive grains were obtained in accordance with the disclosure in U.S. Pat. No. 4,623,364, above earlier mentioned, and assigned to Norton Company, the assignee of the instant application. The entire disclosure of that patent is hereby incorporated by reference. The abrasive material was roll crushed according to usual technique, and then screened in conven-tional fashion to provide 50 grit abrasive grains. The abrasive material was of the following standard composition:

| Component | Weight Percent |
| --- | --- |
| $Al_2O_3$ | 99.58 |
| $SiO_2$ | 0.12 |
| $Fe_2O_3$ | 0.03 |
| $TiO_2$ | 0.20 |
| CaO | 0.04 |
| MgO | 0.02 |
| $Na_2O$ | 0.01 |

Other properties: density 3.89(water Pyc), 3.88(helium Pyc); hardness 20.7 (GPa); and avg. crystallite size 0.17 microns.

The alumina-zirconia abrasive material was obtained in accordance with the disclosure in U.S. Pat. No. 3,891,408, above earlier disclosed. The abrasive grains used in this example were obtainby combining a number of sample lots and had the following approxmate composition, with a eutectic colony size of less than about 65 microns, and a primary numerical average crystal size of less than about 50 microns:

| Component | Weight Percent |
| --- | --- |
| $Na_2O$ | 0.01 |
| $SiO_2$ | 0.29 |
| $ZrO_2$ | 39.15 |
| $TiO_2$ | 0.31 |
| $Fe_2O_3$ | 0.05 |
| CaO | 0.10 |
| MgO | 0.01 |
| Hf | 0.7 |
| $Al_2O_3$ | 59.1 |

Large chunks of the abrasive material manufactured were impact crushed according to usual technique. Afterwards, these chunks were then conventionally roll crushed and screened to obtain 50 grit abrasive grains.

The abrasive grains of each of the abrasive compositions when screened met the standards set forth for 50 grit abrasive grain, based upon standard sands, in the ANSI (American National Standards Institute, Inc.) Publication B74.18-1984, i.e., deviation overgrade $+2+10$, fines $+11-17$.

The sol gel process alumina abrasive grains and those of alumina-zirconia were then blended together according to usual techniques in a conventional grain blender to obtain grain blends of the desired volume percents indicated in Table 1 below.

The coated abrasive discs (7" dia., ⅞" central opening) were individually manufactured using conventional procedures, conventional 0.030" vulcanized fibre backings and conventional calcium carbonate-filled resol phenolic resin make (48% resin, 52% filler) and size (48% resin, 52% filler) coats. The maker coat resin, following application of the abrasive grains while still wet, was partially cured for 5 hours at 225° F. followed by a final dry and cure, following size coat application, for 10 hours at 225° F. The coating was done using conventional roll coating techniques in a one pass operation with curing in a forced air oven. The resin coating weights (wet basis) were as follows: maker coat, 15#/Rm; and size coat, 23#/Rm. A ream ("Rm") is equivalent to 330 square feet of coating area. The abrasive grains were coated according to usual techniques, using electrostatic upward projection. The coating weights of abrasive grain for the various discs tested are set forth in Table 1 below:

TABLE 1

| Fiber Discs Abrasive Grain Blend Weights | | |
|---|---|---|
| Disc No. | Type Abrasive Or Blend | Abrasive Weight (lbs/Rm) |
| 1. | 100% A.Z. | 44 |
| 2. | 75% A.Z.-25% S.G.[1] | 44 |
| 3. | 50% A.Z.-50% S.G. | 44 |
| 4. | 25% A.Z.-75% S.G. | 44 |
| 5. | 100% S.G. | 44 |

[1] Percents of each abrasive grain material in the blends of this invention are by volume. The density of the S.G. grain is 3.95 gms/cc while the density of the A.Z. grain is 4.60 gms/cc. Thus, the volume of a 10# sample of the S.G. grain would be equal to (10#*1.16) or 11.6# of the alumina-zirconia grain.

The cured discs, after conditioning at 50% R.H., 70° F., were then conventionally 0°-90° flexed to controllably crack the hard resin bond (maker and size coats), using a rubber roll flexer, and then were curl corrected, according to conventional techniques, after which they were used in tests conventionally performed in evaluating fiber discs for low (112 DsIII) and high (112 Dsh, 112 Dss) pressure dulling. In general, such tests involve mounting the abrasive disc on a medium hard rubber back-up pad which is, in turn, mounted to a horizontally disposed motor driven spindle assembly mounted on a carriage which is free to move in a horizontal direction on frictionless bearings inwardly toward and from a hydraulicly driven specimen holder. The specimen holder is adapted to accept either a 1"×1"×9¾"-¼" angle or a 3"×3/16"×15" long flat plate and moves horizontally in a direction 90° to the spindle, reciprocating back and forth at a predetermined rate of speed over a predetermined distance. The testing apparatus is mounted on a substantial steel table support providing stability during operation. The grinding force is applied by hanging a dead weight on a pully system attached to the moveable carriage on which the spindle (disc) is mounted. The disc is provided at an angle of 10° from parallel to the specimen holder.

TABLE 2

| Relative Results of Cut Performance of Blends of Sol Gel Process Alumina Abrasive Grains With Fused Alumina-Zirconia Abrasive Grains | | | |
|---|---|---|---|
| Abrasive Blend Composition | 112DsH 1020 Steel | 112Dss 304 SS | 112DsIII 3" Plate |
| 100% A.Z.(control) | 100% | 100% | 100% |
| 75% A.Z.-25% S.G. | 124 | 98 | 139 |
| 50% A.Z.-50% S.G. | 192 | 102 | 159 |
| 25% A.Z.-75% S.G. | 156 | 98 | 155 |
| 100% S.G. | 167 | 98 | 166 |

Test 112 DsH—is a high pressure (10 lbs. force-50 grit grain, 12 lbs. force—36 grit, maintained against the workpiece by the back-up pad) dulling test wherein the fibre disc is applied to grind the ⅛" thick edge of a 1"×1"×9¾"-1018 or 1020 carbon steel construction angle (⅛"). The angle-shaped work piece is first weighed and then is mounted on the specimen holder which reciprocates back and forth over a distance of 9¾ inches, at a rate of 8½ strokes/min. and a linear speed of 7 ft./min. The abrasive disc is driven at 3450 rpm. The grinding cycle is two minutes after which the angle specimen is removed and the loss of weight recorded. This cycle is then repeated with new angle specimens inserted as required until a minimum grinding rate of 10 grams/min. is reached. This ends the test. The data is recorded in grams (gms.) removed per two minute interval, number of intervals to test end, and total cut (gms.) removed by the disc being evaluated. The test results are usually shown as the per cent of a control disc and are so recorded above.

Test 112 Dss—This test is identical to Test 112 DsH except that the specimen is a 304 stainless steel angle, substituted for the carbon steel angle, the grinding interval is one minute, and the test end is 10 intervals. The grinding force, moreover, is 7 lbs. for 50 grit and 10 lbs. for 36 grit discs.

Test 112 DsIII—This test is similar to Test 112 DsH except that it is a low pressure test—10 lbs. force—the specimen is a 3"×3/16"×15" long cold drawn carbon steel plate and such is adapted in the mount so that the fiber disc grinds the 3" face of the plate. The grinding interval is one minute, and the test is ended when the cut rate is less than 3 gms./min.

The data in Table 2 above shows, quite surprisingly it is believed, that for 1020 carbon steel (high pressure test) an abrasive grain blend of 50% by volume aluminia-zirconia abrasive grains and 50% by volume sol gel process alumina abrasive grains cut 192% that of the control disc which contained only alumina-zirconia abrasive grains therein. Based upon the control disc, the amount of cut appears to increase with an ever increasing amount of the sol gel grain in the abrasive blend, up to the 50% level, after which it drops off. At the 50/50 level, however, the amount of total cut is dramatically greater than the cut with a disc containing only either of the abrasive grains alone. Moreover, even when the abrasive blend contains only 75% sol gel grain, the cut performance is still about the same as when the disc is of 100% sol gel abrasive grains.

In the case of the low pressure test (112 DsIII), the cut results are seen to be about the same whether the abrasive grain blend is 50/50 or the abrasive grains in the disc are 100% sol gel abrasive. Nevertheless, when the abrasive blend is only about 25% by volume sol gel abrasive, the total cut is significantly greater than when the fibre discs are of only the alumina-zirconia abrasive grains.

The cut performance on stainless steel (112 Dss-high pressure test), however, is seen to be about the same whether an abrasive blend is used, or the fibre disc contains only zirconia-alumina grains. In general, however, a lesser performance with coated abrasive material containing only sol gel alumina grains is found in grinding stainless steel, compared to alumina-zirconia grains.

Thus, based upon the above results, coated abrasive material can be manufactured for certain applications where sol gel alumina grains has shown, in the past, most optimum performance using instead an abrasive blend of such abrasive with abrasive grains of alumina-zirconia and achieve at least equivalent performance and, in some cases, even better performance is achieved. This being the case, the overall cost of manufacture of a coated abrasive product containing this superior sol gel abrasive can be considerably reduced, in some cases, without any real trade-off in performance. Moreover, in coated abrasive applications where the alumina-zirconia abrasive has, in the past, been found most effective, using an abrasive blend of such grain with sol gel process alumina grain will provide even better performance. Since, at present, coated abrasive material containing sol gel abrasive grain alone are more expensive than those containing alumina-zirconia grains alone, blending of the two abrasive grains in coated abrasive manufacture will result in coated abrasive material more cost/performance effective than those containing sol gel abrasive or alumina-zirconia alone.

EXAMPLE 2

Coated Abrasive Material Having Blends of 36 Grit Sol Gel Alumina and Alumina-Zirconia Abrasive Grains Fibre discs were manufactured as in Example 1 except that the grit size of the abrasive grains used was 36. The grading met the standards earlier mentioned for 36 grit, i.e., deviation overgrade +2+10, fines +14−14. The results of the tests performed, as earlier described, are shown in Table 3 below.

TABLE 3

Relative Results of Cut Performance of Blends of Sol Gel Process Alumina Abrasive Grains With Fused Alumina-Zirconia And Fused Alumina

| Abrasive Blend Composition | 112DsH 1020 Steel | 112Dss 304 SS | 112DsIII 3" Plate |
|---|---|---|---|
| 100% A.Z.(control) | 100% | 100% | 100% |
| 50% A.Z.-50% S.G. | 125 | 94 | 220 |
| 100% S.G. | 116 | 94 | 417 |

This data, like that in Example 1, shows that a 50/50 blend (by volume) of sol gel process alumina and alumina-zirconia abrasive grains provides improved performance in total cut on 1020 steel, when compared to coated abrasive discs containing only either of the blended grains alone.

The performance on cutting stainless steel where a 50/50 blend was used is seen to be substantially equivalent to that where either of the blended abrasive grains is used alone. Quite surprisingly, however, the low pressure test using 36 grit abrasive grains did not confirm the results in Example 1. The test data in this example indicates there to be improved performance, as before, using a 50/50 blend, compared to alumina-zirconia grains alone. Nevertheless, it showed also that such a blend performed significantly less well than fibre discs having only sol gel abrasive grains thereon. Even so, however, such a coated abrasive material provides, due to its superior performance, an economical substitute where alumina-zirconia abrasive material has been used heretofore, in some applications.

EXAMPLE 3

Evaluation of Coated Abrasive Material Having Dual Abrasive Grain Layers With The Top Layer Containing The Abrasive Grain Blend In this example the coated abrasive material evaluated is a so-called "split coat" in that the abrasive material has two layers of abrasive grain, the weight of the abrasive grain desired in the coated abrasive material being split into two layers, 40% in the first or bottom layer, 60% in the top layer. Nevertheless, the coated abrasive material has only one maker coat.

The abrasive grains of sol gel process alumina were of the typical composition and characteristics as set forth earlier in Example 1. The composition of the alumina-zirconia grains was approximately 42-43% zirconium oxide with a correspondingly lesser amount of the aluminum oxide, compared to the composition of Example 1, with the remaining ingredients remaining essentially the same amounts. The zirconium oxide in this grain composition is greater than about 55% in the tetragonal form. Abrasive grains blends in both 36 and 50 grit size were evaluated in the tests described below with the performance results set forth in Table 3, against coated abrasive material of like manufacture for the particular grit size involved except that the coated abrasive material used contained only grains of sol gel process alumina, of the same composition as the abrasive grains used in the blend. The abrasive grains in each case were graded to meet the standards earlier disclosed. Blending of the abrasive grains was obtained by mixing of the grains in a conventional grain blender.

The coated abrasive material in each case was manufactured by coating onto a conventional woven polyester backing member according to usual techniques a conventional calcium carbonate-filled resol phenolic maker composition having about 75% solids comprising about 43.6% phenol-formaldehyde resin, about 54.5% calcium carbonate, about 1.6% water, and about 0.25% silane, to provide an add-on weight of about 19 lbs. (28 lbs.—36 grit) per sandpaper maker's ream ("Rm" as before described in Example 1). Afterwards, a first layer of conventional high purity brown aluminum oxide (36 grit—23.8 lbs./Rm, 50 grit—16.2 lbs./Rm) was applied by gravity coat according to usual technique to respective maker coated backings, while the maker coat was still wet. This was followed by application of the 50/50 blend (by volume) of sol gel process alumina abrasive grains and alumina-zirconia grains according to conventional upper propulsion electrostatic technique in the following approximate amounts—(36 grit—35.7 lbs./Rm; 50 grit—24.4 lbs./Rm). In the control abrasive material, only sol gel alumina abrasive grains were applied in the upper layer (36 grit—35.7 lbs./Rm; 50 grit—24.4 lbs./Rm).

The maker coat was then in each case dried and partially cured by conventionally heating the respective coated materials according to usual technique over a period of about 90 minutes at a temperature increasing from about 175° to about 235° degrees F. Next, a conventional Cryolite-filled resol phenolic size coat composition was applied to the respective abrasive grain layers, this composition comprising about 75% solids and being in the case of the 50 grit grain about 39.1% phenol-formaldehyde resin, 48.4% Cryolite, 10.2% water, 2.0% dye for color, and 0.25% organosilane, in an amount of of from about 28 to 36 lbs. per sandpaper maker's ream, based upon the visual expertise of the operator. The size coat composition in the case of the 36 grit abrasive material comprised, on a solids basis, approximately, 40.5% phenolformaldehyde, 50.1% Cryolite filler, 7% water, 2.0% dye for color, and 0.25% organosilane adhesion promoter. The coated abrasive material in each case was then subjected to a temperature of from about 165° to 235° degrees F. over a period of 135 minutes according to conventional techniques to dry and partially cure the size coat. Afterwards, the coated abrasive material was taken down in rolls and further cured by heating such in conventional manner for 12 hours at 235° F.

Thus, coated abrasive material according to the invention was provided in which the first abrasive layer of conventional alumina grain was approximately 50% of the total grain weight and the second or top abrasive grain layer was a blend consisting of 50% by volume sol gel process alumina grain and 50% by volume conventional alumina-zirconia grain. As a result, the abrasive mineral in the coated abrasive material contains only about 30% by volume of the more expensive sol gel abrasive grain.

The abrasive material above-manufactured was then converted into abrasive belts according to usual techniques. The abrasive belts were then evaluated in the tests indicated below in Table 4. The results are set forth in the table.

grams per min. is reached. For this evaluation, a 200 lb. force was applied to the test bars. The test bars, as indicated in Table 4 were 4141 steel and 304 stainless steel.

The equipment is instrumented to read and record the amount of metal removed and the amount of HP consumed during the grind cycle.

In the tests performed, a coated abrasive belt of the 100% sol gel abrasive grain was tested using the before described procedure and used as the CONTROL. The test was then repeated using the 50/50 blend belts. The results are reported in the table in "percent of control."

122Ds PLUNGE GRIND TEST—This test is designed to evaluate the grinding performance of coated abrasive belts in a plunge grind configuration under medium pressure ranges. The test procedure is basically the same as that described above.

The equipment used consists of a SETCO Floor Lathe Belt Grinding Machine modified to utilize a 2¼"×60" long endless abrasive belt. A 7" diameter solid urethane covered 90 Durometer Shore A backup wheel is driven by a variable speed 25 HP electric drive at a belt speed of 5000 SFPM.

A special fixture is mounted directly in front of the backup wheel to support and apply a 1" sq. face of the test bar into the coated abrasive belt in a plunge grind configuration known to those in the coated abrasive art. The force is generated by a set of mechanical weights which are applied and removed automatically to obtain a 3 sec. grind and a 30 sec. cool cycle. The amount of metal removed during each grind cycle and total number of cycles run and amount of metal removed are

TABLE 4

Relative Results of Cut Perfomance of Abrasive Belts Of Coated Abrasive Material Having Dual Abrasive Layers Top Layer Being A Blend Of Abrasive Grains of Sol Gel Process Alumina and Alumina-Zirconia

| BELT TYPE | HIGH FORCE BELT PLUNGE TESTS | | | CONVENTIONAL BELT TESTS | |
|---|---|---|---|---|---|
| | SETCO 200 PSI 1" SQ 4142 STEEL | SETCO 200 PSI 1" SQ 304 STN STEEL | 122 Ds 80 PSI 1" SQ 1018 STEEL | 102 Ds 4140 STEEL | 102 Dss 304 STNLESS STEEL |
| | 50 GRIT ABRASIVE GRAINS | | | | |
| CONTROL | 100% | 100% | 100% | 100% | 100%[1] |
| 50/50 BLEND | 81 | 112 | 121 | 95 | 130[2] |
| | 36 GRIT ABRASIVE GRAINS | | | | |
| CONTROL | 100% | 100% | 100% | 100% | 100% |
| 50/50 BLEND | 108 | 134 | 74 | 112 | 175 |

[1] Control belt-sol gel alumina abrasive grain.
[2] 50/50 sol gel alumina and alumina-zirconia.

HIGH FORCE PLUNGE GRIND TESTS:

SETCO/KLK—The equipment for this test consists of a SETCO Floor Lathe Belt Grinding Machine complete with a 24" diameter urethane covered 90 Durometer Shore A backup wheel driven by a 50 HP electric drive. Wheel speed is 906 rpm resulting in a belt speed of 5700 SFPM. Belt size is 3"×132".

Special fixturing is mounted directly in front of the backup wheel to support and apply the test bars to the coated abrasive belt. A 1"×'"×36" metal test bar is assembled to the fixture in such a fashion that the 1" sq. face of the bar is plunged into the face of the coated abrasive belt when air pressure is applied to the 4" bore air pressure cylinder. Automatic timers apply the pressure for 3 sec., withdraw the test bar for a 30 sec. cooling period and reapply the pressure. The test is normally run for 30 cycles or until a minimum cut rate of 10 recorded. The test is ended when cut per cycle rate of 10 grms./min. is reached.

For this evaluation, an 80 lb. weight was applied. The test bars were of 1018 steel. Results are reported in "percent of control."

CONVENTIONAL BELT TESTS

Test procedure 102D is a dulling/life performance evaluation on coated abrasive belts in a conventional grinding configuration.

The equipment consists of a carriage assembly mounted on frictionless bearings aligned so it can move freely in horizontal direction when the force of the attached mechanical weights is applied. Mounted to this carriage is a motor driven vertically mounted spindle supporting a 7" diameter serrated with ⅜" lands and grooves, urethane covered 55 Durometer Shore A backup wheel and takeup unit configured to accept a 2½"×60" coated abrasive belt mounted horizontally, parallel to the floor.

In this configuration, a ½"×3"×9¾" long metal test bar is abraded along the ½" face in a conventional back and forth grinding method for a controlled period of time. The test bar is allowed to cool, the amount of metal removed during the grinding cycle is recorded and the cycle is repeated.

The metal test bar is mounted to an oscillating fixture which supports the test bar so that the ½" face is presented to the abrasive belt. The fixture oscillates at a rate of 7 ft. per minute. The belt speed is 5000 SFPM.

In this test procedure, the grind time is 2 min. and the test metals 4140 steel and 304 stainless steel. The amount of force applied to the belt is 15# for 36 grit and 12# for 50 grit belts. The metal test bar is assembled to the oscillating fixture, the control belt is mounted to the horizontal carriage, and the test started. The mechanical weights bring the horizontal carriage forward so the coated abrasive belt comes in contact with the ½" face of the test bar while the test bar is moved horizontally back and forth for the 2 min. period when a timer automatically withdraws the belt from the test bar. The bar is removed and weight loss recorded. The cycle is repeated until a cut per cycle rate of 10 gms./min. is achieved (or, in the case of stainless steel, 10-2 min. cylcles have been completed).

The sample belt is then tested using the same procedure and the cut results are recorded as "percent of control."

As shown by the performance data in the above table, the split coat coated abrasive material having the abrasive blend of 50/50 by volume sol gel aluminia abrasive grain and grains of alumina-zirconia performed substantially better in some cases than a 100% sol gel grain belt. For example, in the tests on the 1018 steel, in the case of the 50 grit grains, there is substantial improvement in cut, compared to an all sol gel grain belt. And, the results show dramatic improvement, particularly in 36 grit, on stainless steel.

Thus, as shown by the various above examples in this appliccation, the blending of sol gel process alumina abrasive grain with alumina-zirconia abrasive grain results in coated abrasive material that is clearly superior to either of the abrasive grains coated separately, in certain applications. Moreover, in certain other applications, the blended abrasive grain results in coated abrasive material which incorporates the best features of each separate mineral.

As a result of these tests, it appears that coated abrasive material can be provided having a blend of sol gel process alumina abrasive grains and alumina-zirconia abrasive grains suitable for use in a number of applications where optimum performance has in the past been found only with coated abrasive material having only sol gel alumina grains. This discovery is accompanied by a considerable reduction in abrasive grain costs in coated abrasive material over similar such material of straight sol gel alumina abrasive grain.

The foregoing detailed description has been given for clearness of understanding only and no unnecessary limitations are to be understood therefrom. The invention is not limited to the exact details shown and described for obvious modifications and variations will now occur to those skilled in the art without departing from the spirit and scope of the invention as described in the following claims.

What is claimed is:

1. Coated abrasive material having a backing member and a layer of coated abrasive adhered thereto comprising:
   (a) at least one layer of a maker coat;
   (b) at least one layer of abrasive grains adhered to said backing member by said maker coat; and
   (c) a size coat on top of said at least one layer of abrasive grains said at least one layer of abrasive grains comprising a blend of sol gel process alumina abrasive grains in the proportion of from at least about 15% to about 75% by volume, and abrasive grains of alumina-zirconia abrasive grains in the amount of from about no more than 85% to about 25% by volume.

2. Coated abrasive material according to claim 1 wherein the sol gel process alumina abrasive grains are of a seeded sol gel composition.

3. Coated abrasive material according to claim 1 wherein the alumina-zirconia abrasive grains are of an abrasive composition comprising a near eutectic composition comprising about 35 to about 50% zirconium oxide.

4. Coated abrasive material according to claim 1 wherein the coated abrasive layer has a single layer of abrasive grain.

5. Coated abrasive material according to claim 4 wherein the said layer of abrasive grains is a blend of abrasive grains of sol gel process alumina and alumina-zirconia and the abrasive grains in the blend are in a volume ratio of about 50/50.

6. Coated abrasive material according to claim 5 wherein the sol gel alumina grains are of a seeded sol gel composition.

7. Coated abrasive material according to claim 6 wherein the grit size of the abrasive grains in the blend is 50.

8. Coated abrasive material according to claim 1 wherein the said at least one layer of abrasive grains comprises a first layer of abrasive grains and a second layer of abrasive grains being provided on top of said first layer, both said abrasive grain layers being adhered to the said backing member by said maker coat, and said size coat being over the said second layer of abrasive grains, said second layer of abrasive grains comprising a blend of sol gel process alumina grains and alumina-zirconia abrasive grains in an amount of at least 15% by volume of the sol gel abrasive grains.

9. Coated abrasive material according to claim 8 wherein the first layer of abrasive grains are of fused alumina.

10. Coated abrasive material according to claim 9 wherein the abrasive grains in each layer are 36 grit.

11. Coated abrasive material especially suitable for high pressure grinding applications comprising a layer of abrasive grains adhered to a backing member, said abrasive grain layer comprising a blend of abrasive grains, said blend comprising from about 15% to about 75% by volume of sol gel process alumina abrasive grains and from about 85% to about 25% grains of a fused alumina-zirconia composition.

12. Coated abrasive material according to claim 11 wherein the sol gel abrasive grains are of a seeded gel composition and the alumina-zirconia abrasive grains are of a composition comprising a eutectic composition and the the abrasive grains are in a ratio of 50/50 by volume.

* * * * *